(No Model.)

J. H. PLUCK.
TIRE TIGHTENER.

No. 335,535. Patented Feb. 2, 1886.

Witnesses:
Thos. A. Peacock
J. N. Hodges

Inventor:
James H. Pluck

UNITED STATES PATENT OFFICE.

JAMES H. PLUCK, OF WARESVILLE, TEXAS.

TIRE-TIGHTENER.

SPECIFICATION forming part of Letters Patent No. 335,535, dated February 2, 1886.

Application filed June 26, 1885. Serial No. 169,902. (No model.)

*To all whom it may concern:*

Be it known that I, JAMES H. PLUCK, a citizen of the United States, residing at Waresville, Sabinal cañon, in the county of Uvalde and State of Texas, have invented a new and useful Tire-Tightener, of which the following is a specification.

My invention relates to a simple and easily adjusted tire-tightener for vehicle-wheels with wooden fellies, to be fitted in wheels at joint of felly. It is made of two metal parts, and works by expansion and contraction by the application of a taper screw with corresponding threads in dividing parts. The parts are the width of felly and a fraction less their depth, and bearing solid against their ends are held in place by flanges on each end. As the screw is turned in it forces the parts against the ends of felly, forcing the fellies against the tire, and is prevented from coming in contact with the tire by a rubber fender, or of other substance placed under tire-tightener. Fender is held in place by flanges at each side on bottom of tire-tightener; is also provided with a sliding joint on sides to cover the opening made by expansion. It can be applied to wheels without removing the tire.

Figure 1:
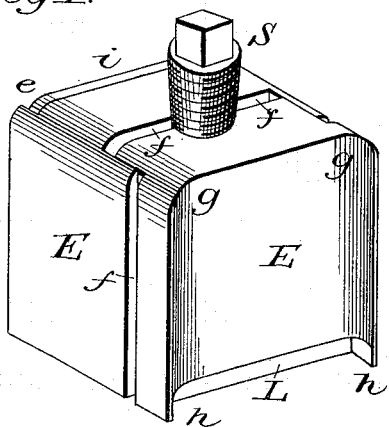

Figure 1, in accompanying drawings, represents the tire-tightener partly divided, as E E; S, taper screw partly down. $g$ $g$ show curves to strengthen flanges; $e$ $g$, flanges to protect edges of felly and hold tire-tightener in place. $f$ shows expansion with taper screw partly down. $i$ shows plate in position for extra expansion, if required. $h$ shows under flanges, to receive L, rubber fender.

Figure 2:
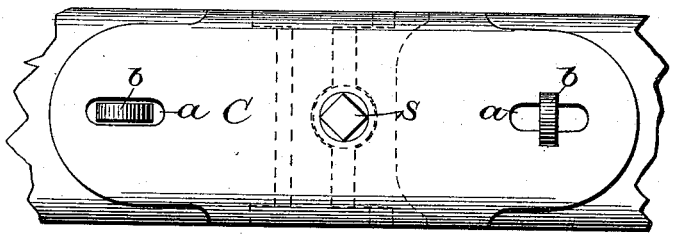

Fig. 2 shows C, clip or cover, in position with tire-tightener outlined. $a$ $a$ are two openings to receive button-screws when turned in; $b$ $b$, button-screws.

Figure 3:
Figure 4:
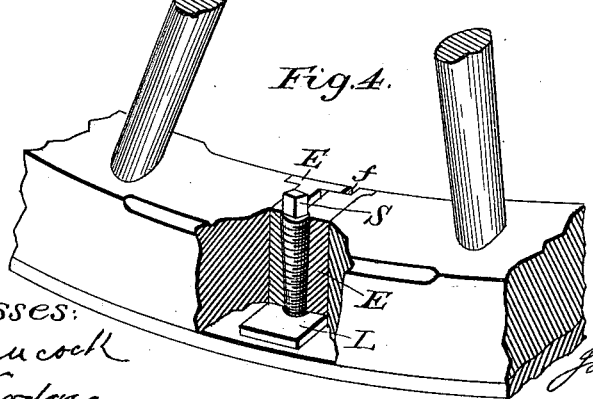

Fig. 3 is a side view of the cover shown in Fig. 2. Fig. 4 shows tire-tightener in position; E E, two parts; S, screw when down; $f$, expansion; L, fender.

I claim—

1. The tire-tightener consisting of the parts E, having flanges overlapping the ends of the fellies, the tapering screw-threaded plug S, for separating the parts E, and the fender L.

2. The combination of the tire-tightener consisting of the parts E, and the tapering screw S, with the cover C, formed with slots $a$, for the passage of the button-screws $b$.

JAMES H. PLUCK.

Witnesses:
    H. NOLL,
    J. N. HODGES.